(12) United States Patent
Boerger

(10) Patent No.: US 8,688,374 B1
(45) Date of Patent: Apr. 1, 2014

(54) HIKING SUGGESTIONS AND PLANNER

(75) Inventor: Marcus Boerger, Zurich (CH)

(73) Assignee: Google Inc., Mountain View, CA (US)

( * ) Notice: Subject to any disclaimer, the term of this patent is extended or adjusted under 35 U.S.C. 154(b) by 285 days.

(21) Appl. No.: 13/281,778

(22) Filed: Oct. 26, 2011

(51) Int. Cl.
*G01C 21/00* (2006.01)

(52) U.S. Cl.
USPC .......................................................... 701/487

(58) Field of Classification Search
USPC .......................... 701/408, 412, 418, 439, 541
See application file for complete search history.

(56) References Cited

U.S. PATENT DOCUMENTS

| | | | |
|---|---|---|---|
| 5,857,066 A * | 1/1999 | Wyche et al. | 345/420 |
| 2004/0214142 A1 | 10/2004 | Sutula, Jr. | |
| 2007/0073524 A1 * | 3/2007 | Song | 703/2 |

* cited by examiner

*Primary Examiner* — Kim T Nguyen
(74) *Attorney, Agent, or Firm* — Fox Rothschild LLP

(57) ABSTRACT

A system and method for providing hiking trail information, including obtaining, by a user device comprising an electronic circuit, estimated physical location for which a user would like hiking trail information regarding, obtaining information regarding one or more hiking trails within a predetermined distance of the estimated location and within a predetermined level of difficulty, and displaying the hiking trail information to the user.

19 Claims, 5 Drawing Sheets

HIKING SUGGESTIONS AND PLANNER

BACKGROUND OF THE INVENTION

1. Statement of the Technical Field

The invention concerns systems and methods for planning and executing hikes. More particularly, the invention concerns online systems and methods for planning and tracking hikes, including provision of a database with hiking plans, periodic position checks and online hiking direction assistance.

2. Description of the Related Art

There are several systems in use today to assist a user with planning a hiking trip. For example, online systems are available for providing information on available hiking trails within a geographic area, which allow a user to plan a trip. Some of these systems provide hiking trail information as well as links to other informative online sites where additional information can be found.

The advent and wide use of mobile devices, such as but not limited to smartphones, has provided an opportunity for not only planning a hiking trip and accessing hiking trail information, but for tracking the actual hike, providing real-time trail and weather information, performing position checks, and providing online direction assistance to help a user stay on the planned hiking route, as well as other useful features.

Many mobile devices are equipped with a system for determining the device's position or location. One such device location system in wide use is the Global Positioning System ("GPS"). The GPS is generally a space-based global satellite system that receives GPS signals from three or more satellites. The GPS signals are used for determining a GPS device's current location on Earth. The current location of the GPS enabled device is determined by computing a difference between a time that each GPS signal is sent by a respective satellite and a time that the GPS signal was received by a GPS receiver of the GPS device. The time difference is then used by the GPS device to compute a distance, or range, from its GPS receiver to the respective satellite. Thereafter, the GPS device computes its own two-dimensional or three-dimensional position using the computed ranges to the satellites and a location of the satellites when the GPS signals were sent therefrom. The multi-dimensional position is typically defined by GPS location coordinates specifying a direction, a latitude, a longitude and/or an altitude.

It would be desirable for a user of a GPS-equipped mobile device to be able to utilize the mobile device for planning and tracking hikes.

In addition, it would also be desirable for a GPS-equipped mobile device to access one or more websites and/or databases across a network to provide information on particular hiking trails from other hikers, as well as to compare the skill and experience levels of other hikers with the level of the user to generate trail suggestions to the user. It would also be desirable for parts of a hiking trail information database to be downloaded to a user's mobile device where it may be edited and maintained.

SUMMARY OF THE INVENTION

An aspect of the present invention provides a system and method for displaying hiking trails and analyzing their structure—e.g., elevation, length, any relevant information that can be found or connected like weather data, any location specific knowledge like water levels, rainfall statistics, etc.

Another aspect of the present invention provides a system and method for incorporating feedback from hikers who report on hiking trails, for example via the hiker's own webpage, through an online site such as wikipedia, or in any other form or format available. In a further aspect of the invention, the reporting hiker's abilities may then be correlated with a user's abilities to provide suggestions. The user's abilities may be determined using historical hiking records or information, or may be input directly by the user.

In another aspect of the invention, the user's progress on a planned hike may be tracked using, for example, GPS provided with a mobile device.

In one embodiment of the present invention, the current user's location may be estimated by a positioning system, such as a global positioning system (GPS) to determine the user's proximity to hiking trails, or location thereupon. In an aspect of the invention, the user may log in information regarding a particular location, or may provide their GPS location information remotely to other individuals, such as friends or even potential rescuers.

Another aspect of the present invention provides for the current user to make comments and provide suggestions for their own or other's use.

In a further aspect of the invention, the current user may enter preferences and search criteria. Once a suggestion can be made, additional close by hiking routes may be offered to the user, as well as hotel and other trip/stay related information. Also, advertisements and links to external booking websites may be presented to the user.

In another aspect of the invention, the user may book nearby hotels, cars and other products or services, or may link to other listed offerings. For example, restaurant and shop links may be presented to the user.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
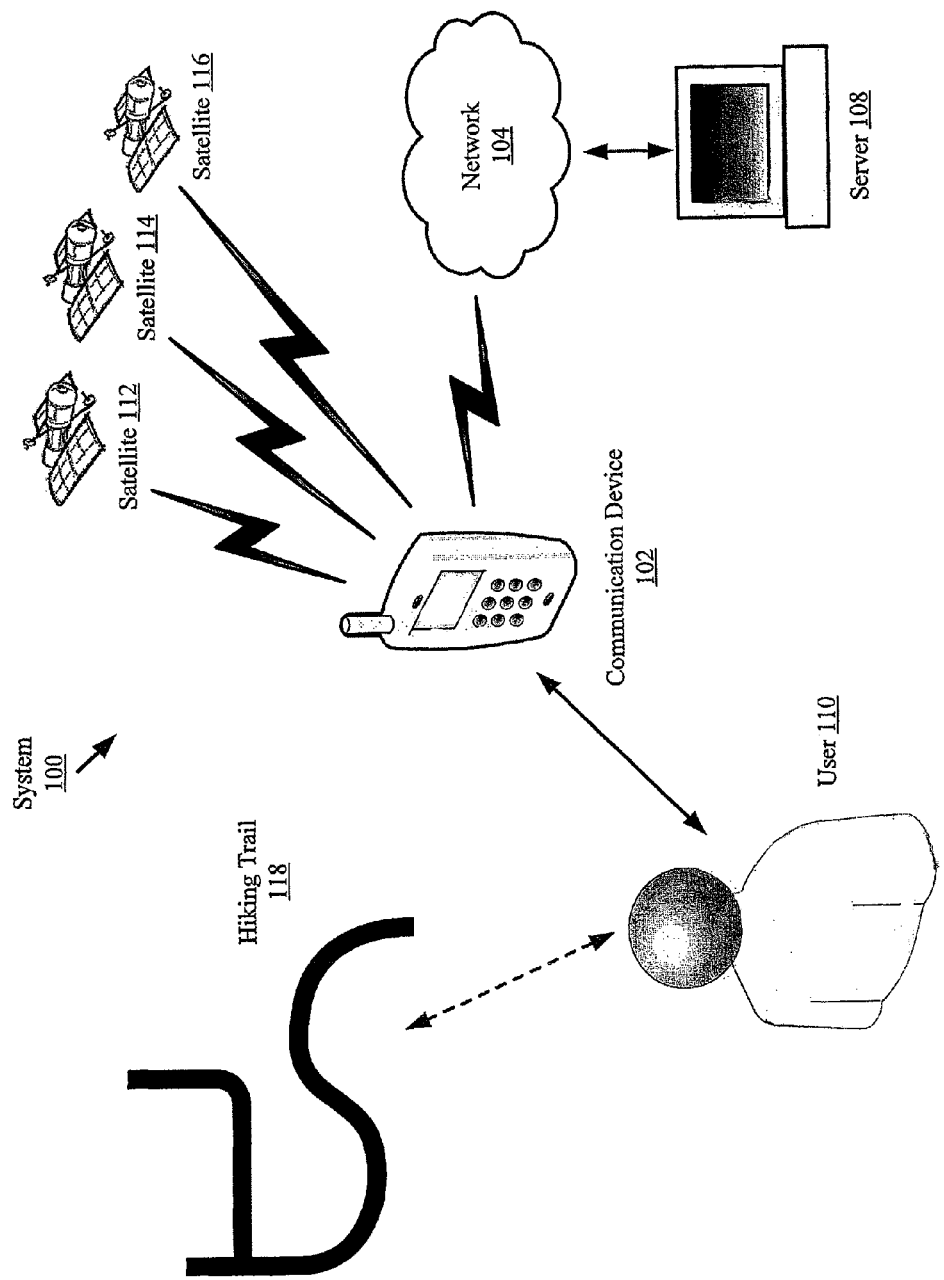
FIG. 1 is a block diagram of an exemplary system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for advantageously providing the ability of a user to plan and track hikes, including provision of a database with hiking plans, periodic position checks and online hiking direction assistance. It also advantageously provides for optionally incorporating feedback from hikers who have reported on the hiking trail via their own web pages or on a website such as Wikipedia, and to correlate the reporting hiker's abilities or skill level with comparison to the user's own skill level, and to provide hiking suggestions based upon the same.

The present invention also allows the user to enter hiking trail preferences and search criteria, and provides a system and method for searching for suitable hiking trails within a geographical area, as provided by a positioning system such as GPS or by direct user input.

The present invention also concerns systems and methods for providing hiking trail information, such as but not limited to hiking trail elevation, length, weather data and location specific knowledge, such as water levels and rainfall statistics, and the like.

Method implementations generally involve obtaining hiking trail information specifying an estimated physical location of a user device, such as, but not limited to, by use of a global positioning system. It is understood that the use of a GPS by certain implementations may be replaced by other positioning systems or other means of determining a position. For example, (E)SSIDs and IP address lookup tables may be employed, or location information may also be input directly by the user. It is also possible that movement of a device may be tracked from an initial known location using an assortment of device sensors to determine the current location.

Method implementations also generally involve obtaining information regarding one or more hiking trails within a predetermined distance of the estimated location of the user device and displaying this information on a display operatively connected to and controlled by the user device. In an exemplary implementation, the information regarding hiking trails includes any of hiking trail elevation, length, weather data, location specific knowledge, such as water levels and rainfall statistics, and the like.

In an exemplary implementation, information regarding the user's hiking abilities is obtained and correlated with feedback information received from other hikers to provide suggestions regarding each of the hiking trails. This information may include user to preferences and search criteria.

Also in an implementation, additional close by hiking trails may be suggested, and listings of hotel and other trip/stay related information provided. Additionally, the user may be allowed to book any of the hotels, cars and related items, and link to listed offerings.

Exemplary implementing systems will be described below in relation to FIGS. 1-3. Exemplary implementing methods will be described below in relation to FIGS. 4, 5 and 6.

Exemplary Systems Implementing the Present Invention

Referring now to FIG. 1, there is provided a block diagram of an exemplary system 100 that is useful for understanding various implementations. The system 100 comprises a communication device ("user device") 102, optional satellites 112-116, a network, such as, but not limited to, the Internet 104 a server 108, a user 110 and one or more hiking trail 118. The system 100 may include more, less or different components than those illustrated in FIG. 1. However, the components shown are sufficient to disclose an illustrative inventive embodiment.

In one implementation, the user device 102 is also equipped with a GPS receiver. The GPS receiver is generally configured to receive GPS signals from the satellites 112-116 and process the GPS signals to determine an estimate of the current location of the user device 102 on Earth. The current location of the user device 102 is determined by computing a difference between a time that each GPS signal is sent by a respective satellite 112-116 and a time that the GPS signal was received by the GPS receiver of the user device 102. The time difference is then used by the user device 102 to compute a distance, or range, from its GPS receiver to the respective satellite 112-116. Thereafter, the user device 102 computes its own two-dimensional or three-dimensional position using the computed ranges to the satellites 112-116 and a location of the satellites 112-116 when the GPS signals were sent therefrom. The multi-dimensional position is defined by GPS data specifying any of a direction, a latitude, a longitude, an altitude and/or a velocity. The position indicates the user device's position, and is then inserted into the sender's email, preferably in the email header.

In alternative implementations, the location of the user device 102 may be input directly by the user, or it may be generated by the user device 102 using different means. Thus, the user device 102 may be a mobile device, such as a smart phone or desktop computer, or the like.

Regardless of how location information is obtained, appropriate efforts can be taken to protect user privacy rights. For example, collection of location data may be on an opt-in basis, so the data is not collected unless the user 110 has been informed of the collection of location data and provided permission for such collection to occur, with the location data stored and handled in a secure manner.

The block diagram of FIG. 1 is also useful for understanding the present invention in operation of an exemplary embodiment. First, a user 110 plans a hiking trip. In planning the trip, the user 110 may select a general area in which to hike using the user device 102, or another device not depicted. The user 110 may directly input the general area such as by inputting a full or partial address, or by other means, such as, but not limited to, selecting the area using a mapping application running on the user device 102, or the like. It is also envisioned that the user 110 may use the GPS of a GPS-equipped user device 102 in the course of their travels to determine the general area for a hiking trip.

The user device 102 would then determine and present one or more candidate hiking trails, represented in FIG. 1 by element 118, to the user 110. The user device 102 may determine the one or more hiking trails 118 by any of several means, such as by accessing a server 108 over a communications network 104. The server would then be configured to look up hiking trails 118 in the general area selected by the user 110, such as by using a database of hiking trail information (not depicted).

In an implementation, the user device 102 would also determine hotels in the general area selected by the user as well as other information which might be useful to the user 110, and present hotel listings, rental cars or related items or links to related information, and any other information to the user 110. Additionally, the user 110 may be allowed to book any of the hotels, cars and related items, or link to the presented related items.

Figure 2:
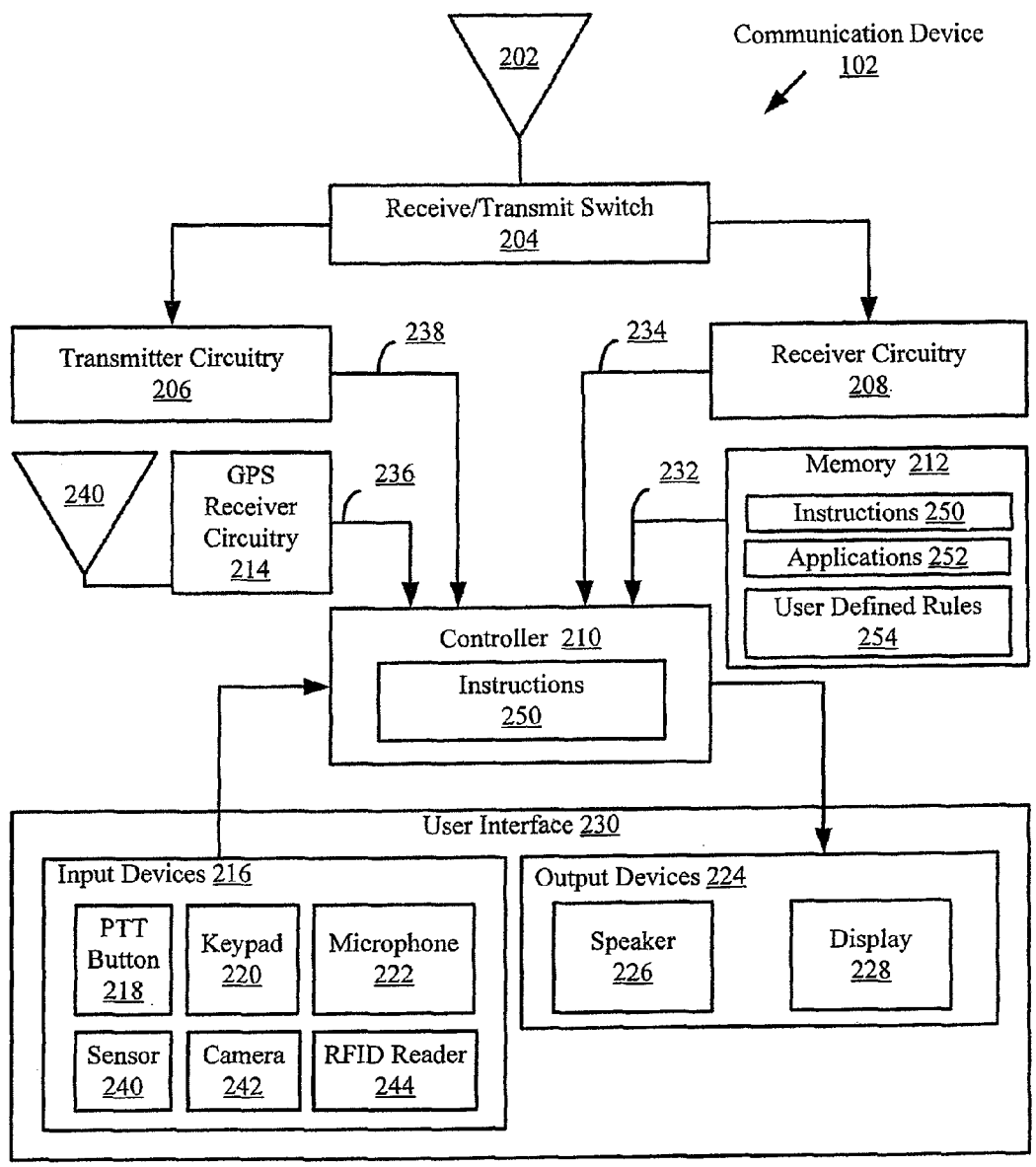
FIG. 2 is a block diagram of an exemplary user device that is useful for understanding the present invention.

Referring now to FIG. 2, there is provided a more detailed block diagram of an exemplary user device 102. The user device 102 will be described herein as comprising a notebook or laptop computer, mobile phone or a smart phone. However, the present invention is not limited in this regard. For example, the user device can alternatively comprise a PDA, a tablet Personal Computer ("PC"), or the like.

Notably, the user device 102 can include more or less components than those shown in FIG. 2. For example, the user 110 can include a wired system interface, such as a universal serial bus interface (not shown in FIG. 2). However, the components shown are sufficient to disclose an illustrative embodiment. The hardware architecture of FIG. 2 represents one embodiment of a representative user device configured to facilitate computing GPS location coordinates and allowing a user 110 to operate the various methods of the present invention as one or more application programs running on the user device 110, as well as to communicate with one or more servers 108 over a network 104, such as the Internet. In this regard, the communication device of FIG. 2 implements a method for computing GPS coordinates, and providing these coordinates to the various applications. Exemplary embodiments of the various methods will be described below in relation to FIGS. 4, 5 and 6.

As shown in FIG. 2, the user device 102 comprises an antenna 202 for receiving and transmitting Radio Frequency (RF) signals. A receive/transmit (Rx/Tx) switch 204 selectively couples the antenna 202 to the transmitter circuitry 206 and receiver circuitry 208 in a manner familiar to those skilled in the art. The receiver circuitry 208 demodulates and decodes the RF signals received from a network (e.g., the network 104 of FIG. 1) to derive information therefrom. The receiver circuitry 208 is coupled to a controller 210 via an electrical connection 234. The receiver circuitry 208 provides the decoded RF signal information to the controller 210. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device (e.g., network equipment of network 104 of FIG. 1).

An antenna 240 is coupled to GPS receiver circuitry 214 for receiving GPS signals. The GPS receiver circuitry 214 demodulates and decodes the GPS signals to extract GPS location information therefrom. The GPS location information indicates the location of the user device 102. The GPS receiver circuitry 214 provides the decoded GPS location information to the controller 210. As such, the GPS receiver circuitry 214 is coupled to the controller 210 via an electrical connection 236. Notably, the present invention is not limited to GPS based methods for determining a location of the user device 102. Other methods for determining a location of a user device 102 can be used with the present invention without limitation.

The controller 210 stores the decoded RF signal information and the decoded GPS location information in a memory 212 of the user device 102. Accordingly, the memory 212 is connected to and accessible by the controller 210 through an electrical connection 232. The memory 212 can be a volatile memory and/or a non-volatile memory. For example, the memory 212 can include, but is not limited to, a Random Access Memory (RAM), a Dynamic Random Access Memory (DRAM), a Static Random Access Memory (SRAM), Read-Only Memory (ROM) and flash memory. The memory 212 can also have stored therein the software applications 252 for implementing the methods of embodiments of he invention as well as user-defined rules 254.

Various implementations allow for other means of providing location information to be written into memory 212. For example, a user 110 may directly provide the location information by direct input to a user interface on the user device (not depicted), as is well understood by designers of user interfaces for user devices. Similarly, other methods of establishing the position of the user device 102 my be employed, such as by triangulation of communication signals from known locations/towers, and the like.

The software applications 252 may include, but are not limited to, applications operative to perform the various methods described herein, as well as applications for generating location coordinates from GPS signals.

As shown in FIG. 2, one or more sets of instructions 250 are stored in the memory 212. The instructions 250 can also reside, completely or at least partially, within the controller 210 during execution thereof by the communication device 102. In this regard, the memory 212 and the controller 210 can constitute machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the communication device 102 and that cause the communication device 102 to perform one or more of the methodologies of the present disclosure.

The controller 210 is also connected to a user interface 230. The user interface 230 is comprised of input devices 216, output devices 224, and software routines (not shown in FIG. 2) configured to allow a user to interact with and control software applications 252 installed on the computing device 102. Software applications 252 may, for example, provide for the use of other positioning technologies in addition to or instead of GPS, such as, but not limited to other satellite-based positioning systems or other techniques such as IP geolocation, or the like. Such input and output devices may respectively include, but are not limited to, a display 228, a speaker 226, a keypad 220, a directional pad (not shown in FIG. 2), a directional knob (not shown in FIG. 2), a microphone 222, a Push-To-Talk ("PTT") button 218, sensors 240, a camera 242 and a Radio Frequency Identification ("RFID") reader 244.

Figure 3:
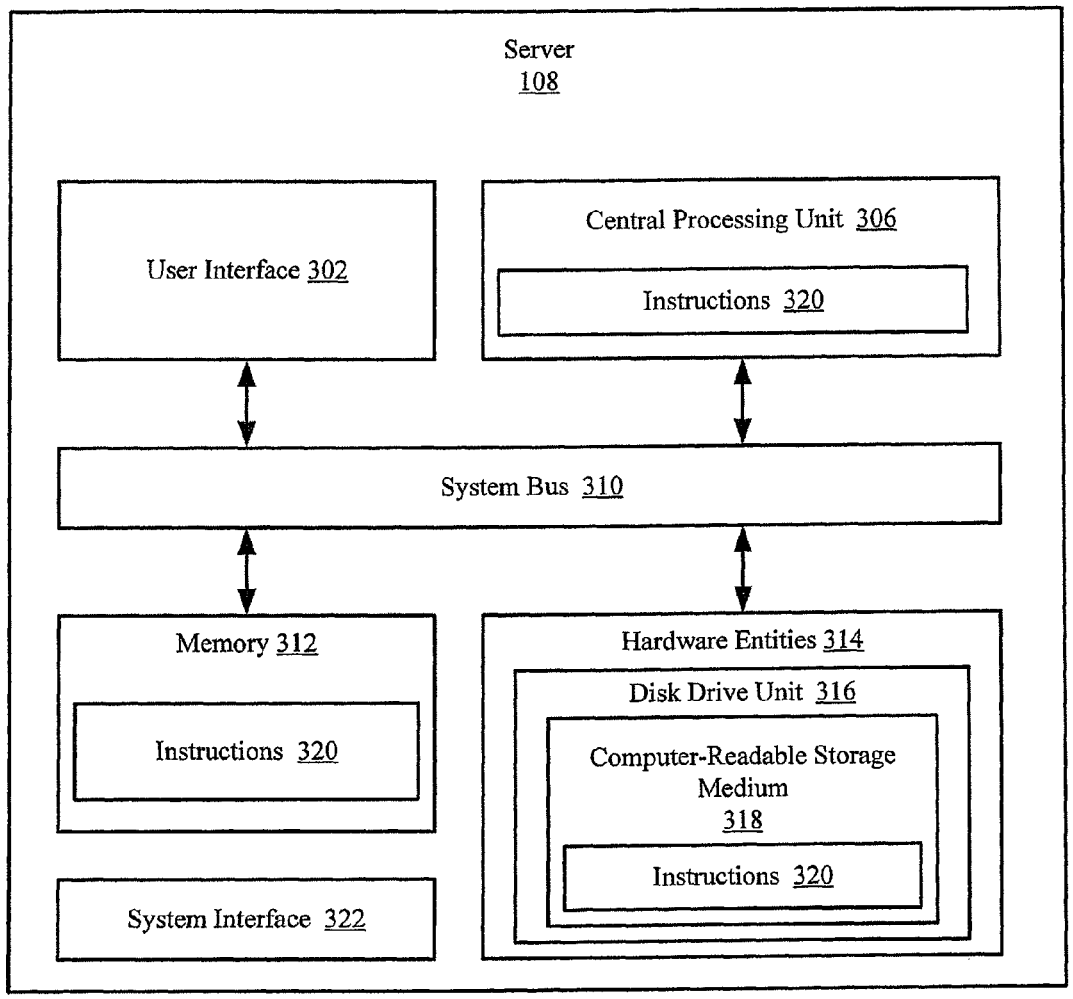
FIG. 3 is a block diagram of an exemplary server that is useful for understanding the present invention.

Referring now to FIG. 3, there is provided a more detailed block diagram of the server 108 of FIG. 1 that is useful for understanding the present invention. As shown in FIG. 1, the server 108 comprises a system interface 322, a user interface 302, a Central Processing Unit (CPU) 306, a system bus 310, a memory 312 connected to and accessible by other portions of server 108 through system bus 310, and hardware entities 314 connected to system bus 310. At least some of the hardware entities 314 perform actions involving access to and use of memory 312, which can be a Random Access Memory (RAM), a disk driver and/or a Compact Disc Read Only Memory (CD-ROM). Some or all of the listed components 302-322 can be implemented as hardware, software and/or a combination of hardware and software. The hardware includes, but is not limited to, an electronic circuit.

The server 108 may include more, less or different components than those illustrated in FIG. 1. However, the components shown are sufficient to disclose an illustrative embodiment implementing the present invention. The hardware architecture of FIG. 1 represents one embodiment of a representative server configured to provide supporting services to a user of a device (e.g., user device 102 of FIG. 1). For example, the server 108 may implement a method for lookup or other determination of the location of known landmarks. It may also provide mapping data to the user device 102, as needed. Exemplary embodiments of said method will be described below in relation to FIGS. 4-5. Also, some implementations do not require the use of a server 108, and provide server functionality by other means, such as, but not limited to, additional use of the user device 102.

Hardware entities 314 can include microprocessors, Application Specific Integrated Circuits (ASICs) and other hardware. Hardware entities 314 can include a microprocessor programmed for facilitating the provision of the automatic software function control services to a user of the communication device (e.g., communication device 102 of FIG. 1). In this regard, it should be understood that the microprocessor can access and run various software applications (not shown in FIG. 3) installed on the server 108. Such software applications include, but are not limited to, applications for setting up, accessing and maintaining a hiking information database as well as applications for looking up hotel and car rental facilities in a given general area and for determining other related information, such as, but not limited to, current and projected weather conditions, hiking trail conditions, comments and information regarding hiking trails provided by other hikers, and links to websites containing additional information relevant to hiking trails. The location estimation applications (not shown in FIG. 3) are operative to facilitate the provision of updated location estimates to a device (e.g., user device 102 of FIG. 1).

As shown in FIG. 3, the hardware entities 314 can include a disk drive unit 316 comprising a computer-readable storage medium 318 on which is stored one or more sets of instructions 320 (e.g., software code or code sections) configured to implement one or more of the methodologies, procedures, or functions described herein. The instructions 320 can also reside, completely or at least partially, within the memory 312 and/or within the CPU 306 during execution thereof by the server 108. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the server 108 and that cause the server 108 to perform any one or more of the methodologies of the present disclosure.

System interface 122 allows the server 108 to communicate directly or indirectly with external communication devices (e.g., communication device 102 of FIG. 1). If the server 108 is communicating indirectly with the external communication device, then the server 108 is sending and receiving communications through a common network (e.g., network 104 of FIG. 1).

As noted above, the system 100 implements methods for planning and tracking hikes, including provision of a database with hiking plans, periodic position checks and online hiking direction assistance. Exemplary embodiments of such methods will now be described in relation to FIGS. 4 and 5.

Exemplary Methods of the Present Invention

Various implementations call for determining the user's hiking skill and/or experience, and correlating this with the difficulty of one or more available hiking trails in order to determine hiking trail suggestions.

There are several ways to determine hiking trail difficulty, and this may be performed by a objective, subjective, or a combined objective/subjective approach. For example, in an objective methodology, the difficulty may be measured from such objective data as trail elevation, length, maximum inclination, day of the year, current or predicted weather conditions—e.g., rain, water levels, temperature, humidity, etc., and the like. Optionally, a user's preference may be applied to weight the objective measurements. For example, one user may be particularly concerned with height or humidity, whereas another user might be primarily concerned with the overall trail length. In an implementation, objective measures may be stored and maintained in a database so that a determination of difficulty may be made dynamically adjusting for the user's needs and/or current or predicted conditions.

The user may also provide information regarding what equipment is available for use. For instance, a cross-country ski hiking tour may not be suggested if the location either has no snow or the user does not have the equipment. And while a user might rent skis, they may not want to fly, which would eliminate heli-skiing, or the like. Also, the user may not have a rescue beacon, and thus may not want to complete off-piste track suggestions.

In a exemplary subjective methodology for determining hiking trail difficulty, trail difficulty may be rated on a numeric scale, for example, from 1=easy to 10=very difficult. The numeric rating may be set by a committee or other group with experience in hiking trails, or may be set by prior users who have hiked a given trail. In the case of prior users, in one example each user would rate the trail from 1-10, and an averaging algorithm may then be used to determine an average subjective numeric trail difficulty rating.

Alternatively, a combination of objective and subjective trail difficulty rating may be employed. For example, a trail with a subjective difficulty rating of medium, or 5, may be rated more difficult during adverse weather conditions, perhaps having the difficulty rating being boosted by several points to difficult, such as, to 8.

Determining the skill level of the user may also be performed using objective, subjective or a combination of objective and subjective means. For example, a user may provide a subjective self-rating, such as on a numeric scale from 1-10 as used for trail difficulty, above, wherein 1=no experience and 10=experienced with very difficult hiking trails. Alternatively, the user's actual hiking trail experience may be used to determine their skill level. In making such a skill level determination, numerous factors may be taken into account, such as but not limited to: difficulty of hiking trails hiked by the user—optionally including an accounting for the trail conditions at the time of the hikes, the time required for the user to complete a prior hike, possibly compared with the normal or average time required for the same hike by other users.

The skill level of the user may also involve building a user profile that contains elevation information of previous hikes, as absolute elevation done per time and/or relative elevation handled in sum over time. As described herein, user position information may be tracked during one or more hikes to help determine the user's skills. For example, the user's progress speed during steep portions of a hike may be used to provide information as to whether the user is particularly sensitive to the maximum inclination and/or height of a trail.

Regardless of the methods used to determine the difficulty of hiking trails and the skill level of the user, in an implementation, recommendations of nearby hiking trails having a difficulty commensurate with the user's experience are then provided. It is also considered that users be able to request nearby hiking trails either above or below their skill levels, in order to allow the users to either challenge themselves or to experience a non-challenging trail.

Figure 4:
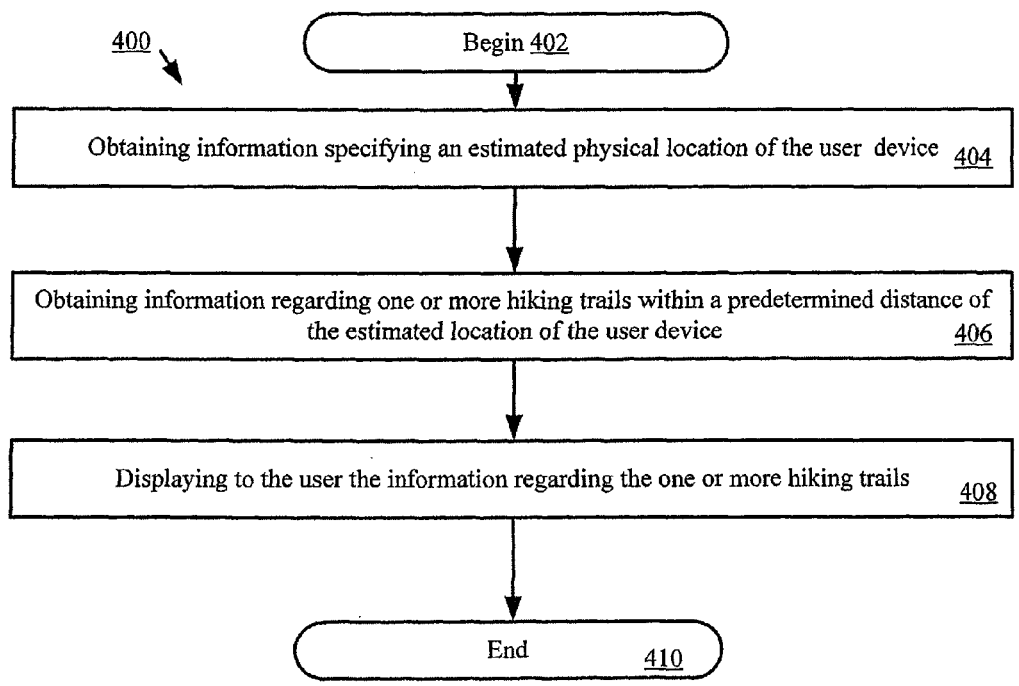
FIG. 4 is a flow diagram of an exemplary method for providing information regarding hiking trails that is useful for understanding the present invention.

Referring now to FIG. 4, there is provided a flow diagram of an exemplary method 400 for providing hiking trail information. The methods herein will generally be described in a notebook or laptop computer, mobile phone or smart phone context. The present invention is not limited in this regard. The method 400 may use other or additional devices, such as a desktop portable computer or a PDAs. In particular, a user may employ a desktop or tablet computer to obtain hiking trail information and plan their trip, and use a mobile GPS-enabled device, such as a smart phone to monitor the actual hike. The methods herein will also be described in a GPS based context, although the method 400 is also not limited in this regard, and is useful in contexts, including those in which the user 110 directly inputs information regarding the general location for which they want hiking trail information, as well as contexts using other location-determining applications, such as reference coordinate system based location applications, radiological topographical survey based location applications, local microwave/sonar beacon/receiver based location applications, ultrasound ranging based location applications, laser ranging based location applications, and/or triangulation based location applications, and the like. The GPS and other automated location determination based contexts are useful in situations in which the user is in the general area about which they want hiking trail information, whereas, direct user input is useful when the user and user device is not located in the general area for which hiking trail information is sought.

As shown in FIG. 4, the method 400 begins with step 402 and continues with step 404. In step 404, information specifying an estimated physical location of the user device is obtained by an electronic circuit of the user device 102. The location of the user device 102 is considered throughout this description as essentially the same location as that of the user. The location of the user device 102 may be obtained by GPS, as described herein, or by other means, such as by direct user input. The physical location input by the user may be completely different from the user's actual location, particularly in the planning of a hiking trip. Any method may be employed to facilitate the input of location information by the user, without exception. For example, in an embodiment of the invention, the system may offer the location as a selection to the user, based on preferences or user searches. The location represents the general geographic area for which the user wants to receive hiking and other information.

Next, the user device 102, through the electronic circuit, obtains information regarding one or more hiking trails within a predetermined distance of estimated location of the user device or the location input by the user, as shown by step 406. Information obtained by the user device 110 may include, but is not limited to, a hiking trail difficulty rating, hiking trail elevation, length, weather data, location specific knowledge, water levels, rainfall statistics, as well as information provided by previous hikers related to each of the hiking trails, including any available information regarding the experience or skill levels of the previous hikers as shared by them, without exception.

The information regarding the one or more hiking trails is then displayed to the user on a display associated with and controlled by the user device 102 in step 408. The process may then terminate 410, or may additional steps (not depicted) may take place.

Figure 5:
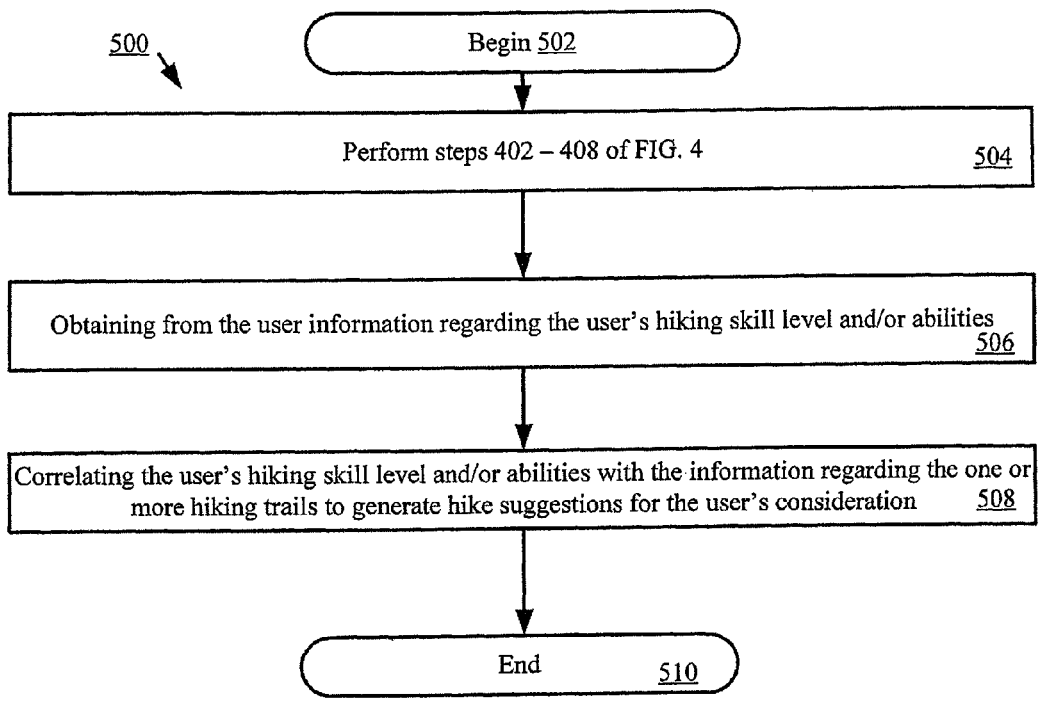
FIG. 5 is a flow diagram of an exemplary method for generating suggestions regarding hiking trails that is useful for understanding the present invention.

Referring now to FIG. 5, there is provided a flow diagram of an exemplary method 500 for correlating user abilities and skill level with feedback information provided by previous hikers, as described above, to provide suggestions regarding hiking trails for the user.

As shown in FIG. 5, the method 500 begins with step 502 and continues with step 504. In step 504, steps 402-408 from FIG. 4 are first performed. In the exemplary method, if the user device 110 receives information regarding the one or more hiking trails which includes information provided by previous hikers, previous hiker skill levels, current or projected trail weather conditions, or the like, the user's hiking abilities or skill level is then obtained 506 by the user device 102. Obtain the user's skill or experience level may be performed by any of several procedures, without limitation. For example, the user may be prompted to directly enter their own estimate of their hiking skill level into a user interface presented on the user device. Alternatively, or additionally, the user's known hiking history may be used to generate a default skill level, which the user may then change.

In an implementation, the user device would then perform a correlation 508 of the user's hiking abilities/skill level with available previous hiker information and any other information available regarding each of the one or more hiking trails, and present the user with one or more suggestions for hikes which the user might consider. At this point the method terminates 510.

In a further implementation, the user would also be provided the opportunity to view and/or book various options for the proposed hikes, such as hotel accommodations, car rentals, air travel, and the like. In addition, the user might also be provided one or more links to web pages having additional information regarding the one or more hiking trails, the general geographic location, and related topics.

In an implementation, the user device is employed during the actual hike to advantageously provide real-time assistance and support to the user. For example, using a GPS-enabled user device, the user's progress along the hiking trail can be monitored, and the user can be alerted if they significantly deviate from the planned trail, or if weather or other local conditions warrant an alert. Similarly, a user might also be able to alter the planned hiking trail to make it longer, shorter, easier, or more difficult, as desired. Additionally, the user device is also available for use in reaching emergency assistance, and having a GPS-enabled user device would allow for the user to provide precise location information.

Having thus described the invention of the present application in detail and by reference to illustrative embodiments thereof, it will be apparent that modifications and variations are possible without departing from the scope of the invention defined in the appended claims.

What is claimed is:

1. A method for providing hiking trail information to a user, the method comprising:
   obtaining, by a user device comprising an electronic circuit, information specifying an estimated physical location for which the user wants hiking trail information;
   obtaining, by said electronic circuit, information regarding hiking skills of said user;
   obtaining, by said electronic circuit, information regarding one or more hiking trails within a predetermined distance of said estimated location;

correlating said user skills and said information regarding one or more hiking trails to provide suggestions regarding each of the hiking trails for said user; and, displaying, on a display operatively connected to and controlled by said electronic circuit, said suggestions and said information regarding said one or more hiking trails.

2. The method according to claim 1, wherein the obtaining information specifying an estimated location is performed by said electronic circuit using a global positioning system (GPS).

3. The method according to claim 1, wherein the obtaining information specifying an estimated location is performed by said electronic circuit accepting location input by the user using a user interface operatively connected to and controlled by said electronic circuit.

4. The method according to claim 1, wherein said information regarding hiking trails comprises numeric hiking trail difficulty ratings.

5. The method according to claim 4, wherein said information regarding hiking skills of said user comprises a numeric user skill rating.

6. The method according to claim 5, wherein correlating of said information regarding hiking trails and said information regarding hiking skills is performed by comparing the numeric hiking trail difficulty ratings with the numeric user skill rating.

7. The method according to claim 1, wherein said information regarding hiking trails comprises hiking trail elevation, length, weather data and location specific knowledge.

8. The method according to claim 7, wherein said location specific knowledge comprises water levels and rainfall statistics.

9. The method according to claim 7, further comprising:
for each of the one or more hiking trails, obtaining, by said electronic circuit, feedback information from one or more hikers who have reported on each said trail.

10. The method according to claim 9, wherein the obtaining information regarding hiking skills of said user further comprises obtaining user preferences and search criteria.

11. A system, comprising:
a user device comprising at least one electronic circuit configured to perform the steps of:
obtaining, by said at least one electronic circuit, information specifying an estimated physical location of said user device;
obtaining, by said at least one electronic circuit, information regarding hiking skills of a user of said user device;
obtaining, by said at least one electronic circuit, information regarding one or more hiking trails within a predetermined distance of said estimated location of said user device;
correlating said hiking skills and said information regarding one or more hiking trails to provide suggestions regarding each of the hiking trails for said user; and,
displaying, on a display operatively connected to and controlled by said at least one electronic circuit, said suggestions and said information regarding said one or more hiking trails.

12. The system according to claim 11, wherein the obtaining information specifying an estimated location is performed by said electronic circuit using a global positioning system (GPS).

13. The system according to claim 11, wherein the obtaining information specifying an estimated location is performed by said electronic circuit accepting location input by the user using a user interface operatively connected to and controlled by said electronic circuit.

14. The system according to claim 11, further comprising:
for each of the one or more hiking trails, obtaining, by said electronic circuit, feedback information from one or more hikers who have reported on each said trail.

15. The system according to claim 11, wherein the obtaining user skill information further comprises obtaining user preferences and search criteria.

16. A device comprising a non-transitory, computer-readable storage medium, having stored thereon a computer program having a plurality of code sections, the code sections executable by computer processor of a user device comprising an electronic circuit to cause the processor to perform the steps of:
obtaining, by said at least one electronic circuit, information specifying an estimated physical location of said user device;
obtaining, by said electronic circuit, information regarding hiking skills of a user of said user device;
obtaining, by said electronic circuit, information regarding one or more hiking trails within a predetermined distance of said estimated location of said user device;
correlating said user skills and said information regarding one or more hiking trails to provide suggestions regarding each of the hiking trails for said user; and,
displaying, on a display operatively connected to and controlled by said at least one electronic circuit, said suggestions and said information regarding said one or more hiking trails.

17. The device according to claim 16, wherein the obtaining information specifying an estimated location is performed by said electronic circuit using a global positioning system (GPS).

18. The device according to claim 16, wherein the obtaining information specifying an estimated location is performed by said electronic circuit accepting location input by a user using a user interface operatively connected to and controlled by said electronic circuit.

19. The device according to claim 16, wherein the information regarding hiking skills of said user comprises a numeric rating, the information regarding one or more hiking trails comprises numeric hiking trails difficulty ratings, and the correlating step is performed by comparing the user's numeric hiking skills rating to the numeric hiking trails difficulty rating from each hiking trail.

* * * * *